(12) United States Patent
Simmons

(10) Patent No.: US 8,333,543 B1
(45) Date of Patent: Dec. 18, 2012

(54) MINING SCOOP MATERIAL EJECTION RETRIEVAL SYSTEM

(76) Inventor: Jack Simmons, Richlands, VA (US)

( * ) Notice: Subject to any disclaimer, the term of this patent is extended or adjusted under 35 U.S.C. 154(b) by 507 days.

(21) Appl. No.: 12/208,340

(22) Filed: Sep. 11, 2008

Related U.S. Application Data

(60) Provisional application No. 60/971,347, filed on Sep. 11, 2007.

(51) Int. Cl.
*B60P 1/00* (2006.01)
(52) U.S. Cl. .................... 414/517; 414/416.04
(58) Field of Classification Search .............. 414/511, 414/517, 813, 525.2, 416.04, 416.09, 492, 414/513; 222/222
See application file for complete search history.

(56) References Cited

U.S. PATENT DOCUMENTS

| 2,810,486 | A | * | 10/1957 | Elton | 414/513 |
|---|---|---|---|---|---|
| 3,273,728 | A | * | 9/1966 | Kelso | 414/513 |
| 3,349,931 | A | | 10/1967 | Wagner | |
| 3,524,559 | A | | 8/1970 | Osborne | |
| 3,674,096 | A | * | 7/1972 | Berg | 172/821 |
| 3,777,915 | A | | 12/1973 | Reed | |
| 3,815,764 | A | * | 6/1974 | Gilfillan et al. | 414/513 |
| 3,865,260 | A | | 2/1975 | Wieschel et al. | |
| 3,953,170 | A | * | 4/1976 | Webb | 414/517 |
| 4,090,627 | A | | 5/1978 | Teti | |
| 4,384,816 | A | | 5/1983 | Martin et al. | |
| 4,576,540 | A | | 3/1986 | Derain et al. | |
| 4,632,628 | A | * | 12/1986 | Kress et al. | 414/513 |
| 4,673,131 | A | | 6/1987 | Travis | |
| 4,890,684 | A | * | 1/1990 | Simmons | 180/419 |
| 6,059,513 | A | * | 5/2000 | Goby | 414/517 |
| 6,062,804 | A | | 5/2000 | Young et al. | |
| 6,079,933 | A | | 6/2000 | Moyna et al. | |
| 6,092,973 | A | | 7/2000 | Burnett et al. | |
| 6,146,079 | A | * | 11/2000 | Ghibaudo | 414/512 |
| 6,176,673 | B1 | | 1/2001 | Moyna et al. | |
| 6,672,822 | B1 | * | 1/2004 | Moyna | 414/517 |
| 2003/0223849 | A1 | * | 12/2003 | Hagenbuch | 414/511 |

FOREIGN PATENT DOCUMENTS

| FR | 1049124 A | 12/1953 |
|---|---|---|
| FR | 2151147 A5 | 4/1973 |
| NL | 7207311 A | 6/1973 |

\* cited by examiner

*Primary Examiner* — Saul Rodriguez
*Assistant Examiner* — Glenn Myers
(74) *Attorney, Agent, or Firm* — Mary-Jacq Holroyd; Johnston Holroyd

(57) ABSTRACT

A bucket and blade assembly has a bucket with opposing side walls, a bottom floor, and a back wall with a centrally located cylinder rod mount. Concentric cylinders ranging from smallest to largest form a telescoping hydraulic cylinder in which the smallest has a cylinder rod mount coupling disposed at one end for engaging the cylinder rod mount. The largest cylinder is engaged in a floating trunnion mount cylinder. The blade is slidably disposed within the bucket with a capped cylinder disposed thereon having an opening into the capped cylinder for accommodating the largest cylinder opposite the rod mount coupling.

14 Claims, 7 Drawing Sheets

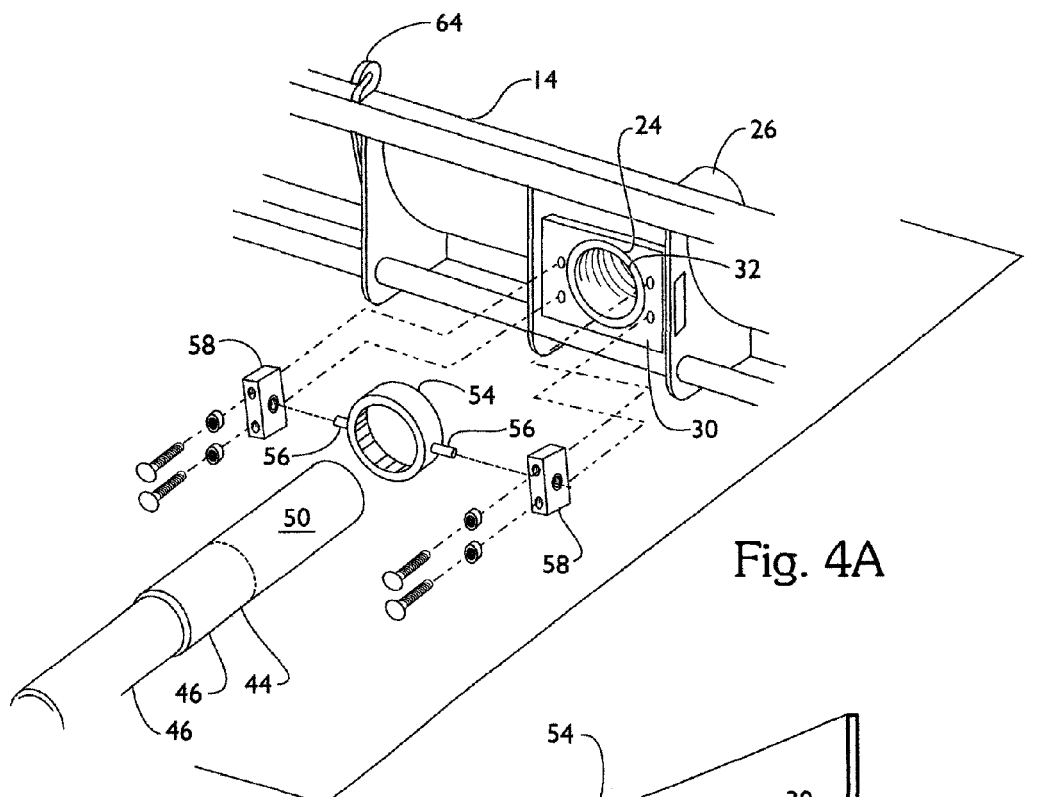
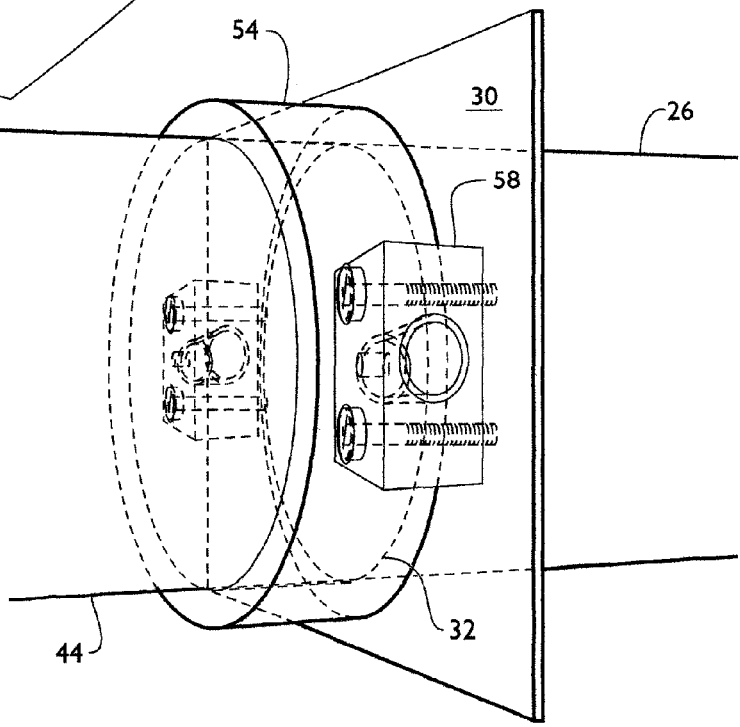

MINING SCOOP MATERIAL EJECTION RETRIEVAL SYSTEM

RELATED APPLICATIONS

This application claims the benefit of U.S. Provisional Application Ser. No. 60/971,347 entitled "Mining Scoop Material Ejection Retrieval System" filed on 11 Sep. 2007, the contents of which are incorporated herein by reference in its entirety.

BACKGROUND OF THE INVENTION

Scoop buckets have been around for many years and have traditionally used the similar ejection systems with similar inherent problems. In the mining field, such as coal mining, the low profile scoop cars and scoop buckets use basically the same ejection cylinder and mounting arrangement. The conventional arrangement utilizes a rigid flange mounted cylinder. Using the ejection system to pull loads into the bucket creates tremendous side load forces when the particular load does not slide smoothly into place. These forces are known to cause premature and sometimes instant failure of the ejection cylinder when utilizing the conventional mounting arrangement. When the blade is moved a hammering action is sometimes seen with the conventional setup. This hammering action also contributes to premature ejection cylinder failure.

Known scoop cars and buckets are particularly adapted for handling minerals, such as coal, after it has been loosened and piled in a mine. In the mining field, each scoop bucket is disposed on one end of a traction vehicle to facilitate loading and unloading therefrom using a blade. A track and guide may be provided to maintain the proper positioning of the blade relative to the scoop bucket. Alternatively, wheels have been used to facilitate the movement of the blade relative to the bottom of the scoop bucket.

U.S. Pat. Nos. 3,777,915 and 4,090,627, the contents of which are incorporated herein in their entirety, show similar scoop devices having ejector blades slidably disposed within scoop buckets. U.S. Pat. No. 3,777,915 issued to Reed on 11 Dec. 1973 teaches a mining scoop with an open bucket ejector mechanism operated by a rack and pinion utilizing an accordion type arm structure, having an upper and lower arm pivotally attached to one another, which mechanism operates hydraulically to extend and retract the blade along a rack disposed on the side of the bucket. U.S. Pat. No. 4,090,627 issued to Teti on 23 May 1978 teaches a scoop car having a blade that is extending and retracted using a telescopic hydraulic cylinder disposed between the blade and the closed end of the scoop car, wherein the very end of the telescopic hydraulic cylinder appears to be attached to the blade at the end of a cup-shaped apparatus disposed in the middle of the blade.

U.S. Pat. No. 4,673,131 issued to Travis on 16 Jun. 1987 discloses a mine dusting machine having a scoop bucket and a hydraulic telescoping cylinder arm to extend and retract a blade. U.S. Pat. No. 6,079,933 issued to Moyna et al. on 27 Jun. 2000 shows a hydraulic circuit for an ejector type dump mechanism for articulated trucks and the like. Similarly, U.S. Pat. No. 6,092,973 issued to Burnett et al. on 25 Jul. 2000 teaches a dial-in ejector speed control for articulated trucks and the like having ejector type dump mechanism. An alternative mine car scoop, shown in U.S. Pat. No. 6,176,673 also issued to Moyna et al. on 23 Jan. 2001, shows a tailgate assembly having side mounted hydraulic cylinders.

A variety of mining vehicles also use a telescoping arm for unloading. U.S. Pat. No. 3,349,931 issued to Wagner on 31 Oct. 1967 shows a telescoping unloading truck for use in low ceiling areas. U.S. Pat. No. 3,524,559 issued to Osborne on 1 Apr. 1968 teaches a mining car with a telescopic hydraulic cylinder attached to a plow for emptying the mining car.

Similar devices are also used in agricultural machinery where a truck bed with a scoop is slidably disposed within the bed. French Patent FR1049124A issued 28 Dec. 1953 shows an agricultural truck bed having a retractable blade disposed in the truck bed in which a hydraulic telescoping cylinder is used to extend and retract the blade.

Another use for such devices is in the field of dump trucks, such as garbage trucks. U.S. Pat. No. 3,865,260 issued to Wieschel et al. on 11 Feb. 1975 teaches a refuse body with two-part packer-ejector platen that uses a telescopic hydraulic cylinder U.S. Pat. No. 4,384,816 issued to Martin et al. on 24 May 1983 shows a dump truck which incorporates a telescopic hydraulic cylinder therein. U.S. Pat. No. 4,632,628 issued to Kress et al. on 30 Dec. 1986 teaches a side-ejection vehicle that utilizes a telescopic hydraulic cylinder to dump the contents of the vehicle bed sideways. U.S. Pat. Nos. 6,059,513 issued to 6,059,513 on 9 May 2000 shows a pull-type rear ejector wagon which uses a telescoping arm pivotally connected to a blade at an angle thereto. U.S. Pat. No. 6,062,804 issued to Young et al. on 16 May 2000 shows a load carrying body and ejector arrangement that uses a hydraulic telescoping arm to eject the contents of the carrying body.

Compactors also use such device. U.S. Pat. No. 4,576,540 issued to Derain et al. on 18 Mar. 1986 shows a device for compacting contents of high capacity semitrailer body that incorporates a telescopic hydraulic cylinder to move a compacting blade.

SUMMARY OF THE INVENTION

The present invention utilizes a bucket and blade assembly. The bucket has opposing side walls, a bottom floor, and a back wall. The back wall has a centrally located cylinder rod mount. Concentric cylinders ranging from smallest to largest forming a telescoping hydraulic cylinder. The smallest has a cylinder rod mount coupling disposed at one end for engaging the cylinder rod mount. An ejector blade is slidably disposed within the bucket and has a capped cylinder disposed thereon with an opening through the center of the ejector blade into the capped cylinder for accommodating the largest cylinder opposite the rod mount coupling. The largest cylinder is engaged in a floating trunnion mount cylinder.

The scoop car includes a blade which is movable to unload material from scoop car. Blade is moved by a telescopic hydraulic cylinder which is disposed between blade and the closed end of scoop car. When it is desired to unload scoop car hydraulic cylinder is activated and scoop pushes any material contained in the bed of scoop car out of the open end.

A primary issue addressed with the present design is side loading of the cylinder which causes premature failure. End users must keep a spare cylinder and are routinely required to change it out due to failure. By incorporating a floating trunnion mounting arrangement, we eliminate the side loading from within the ejection cylinder. The side loads are now transferred through the guide system into the structure of the scoop bucket which is designed to handle the stresses created.

This mounting arrangement also allows us to use the ejection system to retrieve loads (pull them into the bucket). Hooks and the like are disposed along a top of a blade to permit chains and the like to be hooked thereto.

The cylinder has been mounted at such an angle to produce a consistent downward force on the guide system to create a smooth ejection cycle, eliminating the hammering action sometimes seen with the conventional setup.

These and other aspects of the present invention will become readily apparent upon further review of the following drawings and specification.

BRIEF DESCRIPTION OF THE DRAWINGS

The novel features of the described embodiments are specifically set forth in the appended claims; however, embodiments relating to the structure and process of making the present invention, may best be understood with reference to the following description and accompanying drawings.

FIG. 4A is an exploded view of a floating trunnion mount showing a telescoping cylinder and ejector blade, according to an alternative embodiment of the present invention.

FIG. 4B is a side view of a retainer plate and floating trunnion according to an alternative embodiment of the present invention.

Similar reference characters denote corresponding features consistently throughout the attached drawings.

DETAILED DESCRIPTION OF PREFERRED EMBODIMENTS

Figure 1:
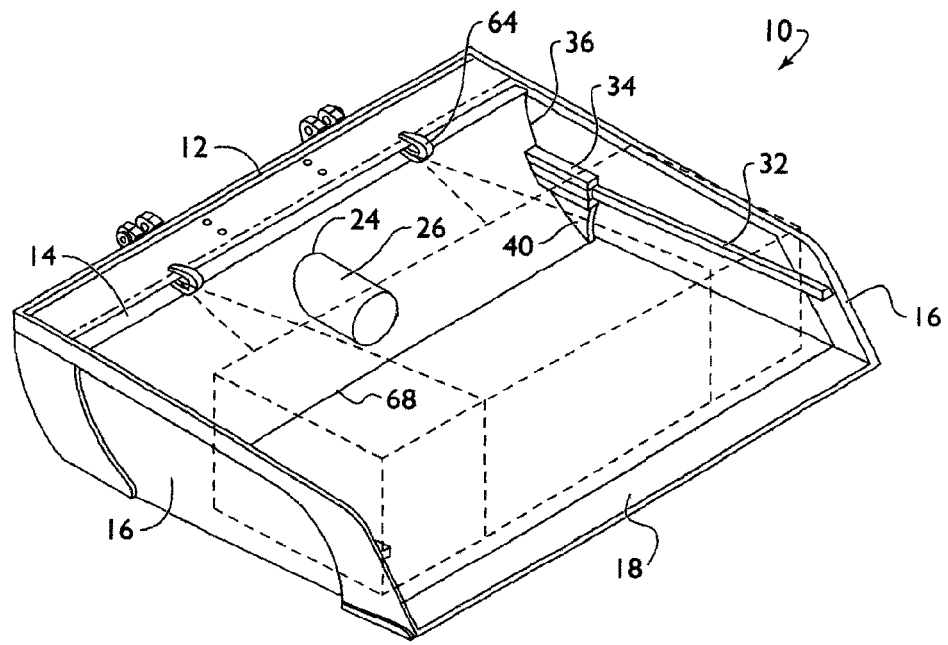
FIG. 1 shows an elevated environmental view of a mining scoop ejection system wherein the ejection blade is positioned in the back of the bucket according to an embodiment of the present invention.
Figure 2:
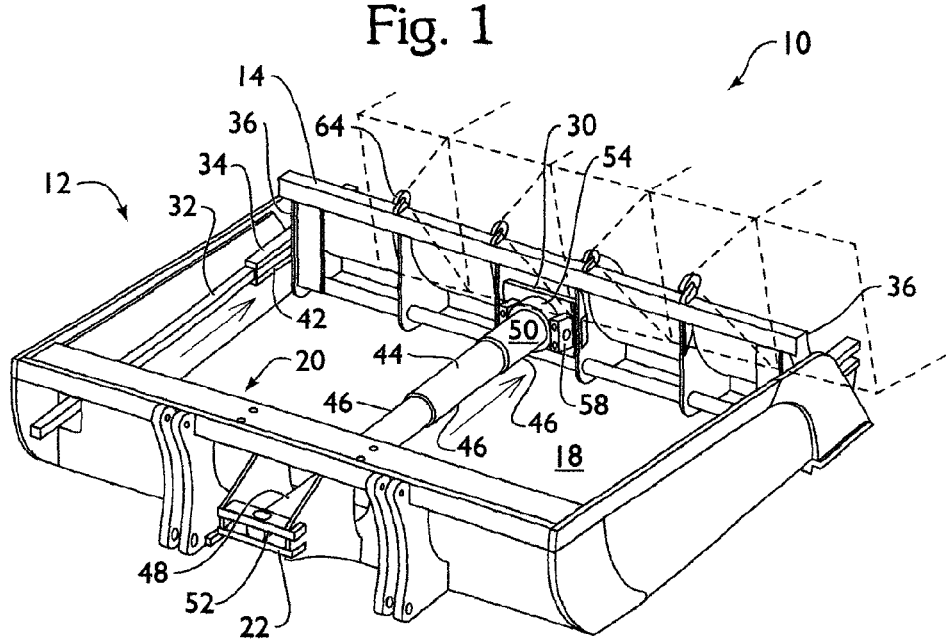
FIG. 2 shows an elevated environmental view of a mining scoop ejection system wherein the ejection blade is positioned in the front of the bucket according to an embodiment of the present invention.

A scoop bucket 12 and ejector blade 14 assembly 10 has a bucket 12 with two opposing side walls 16, a bottom floor 18, and a back wall 20. FIGS. 1 and 2 shows a mining scoop ejection system according to an embodiment of the present invention. The back wall 20 has a cylinder rod mount 22 disposed thereon, as shown in FIG. 2. The ejector blade 14, having two opposing ends 36, slidably disposed within the bucket 12 extending from the floor 18 between the opposing side walls 16. The ejector blade 16, has a body 66 with two opposing ends 36 and a bottom edge 68 extending therebetween.

Figure 3A:
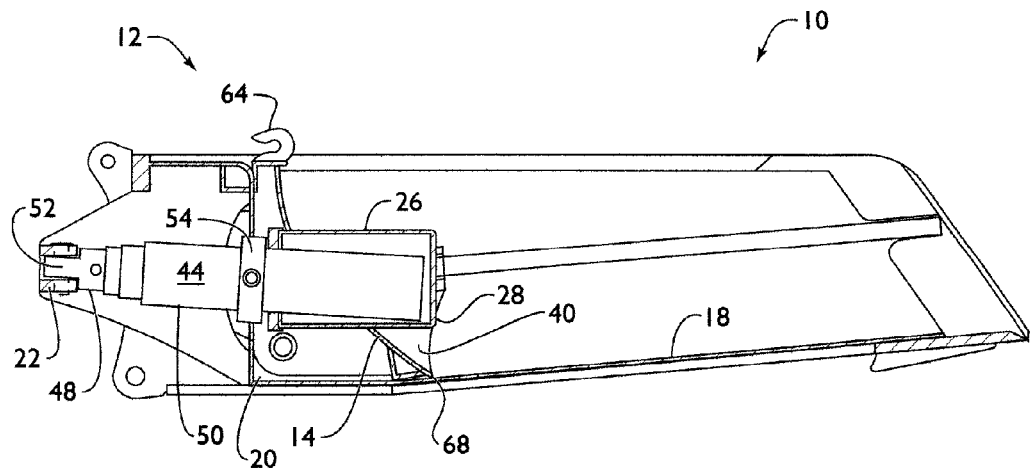
FIG. 3A is a side cutaway view of a mining scoop ejection system wherein the ejection blade is retracted to the back of the bucket according to an embodiment of the present invention.
Figure 3B:
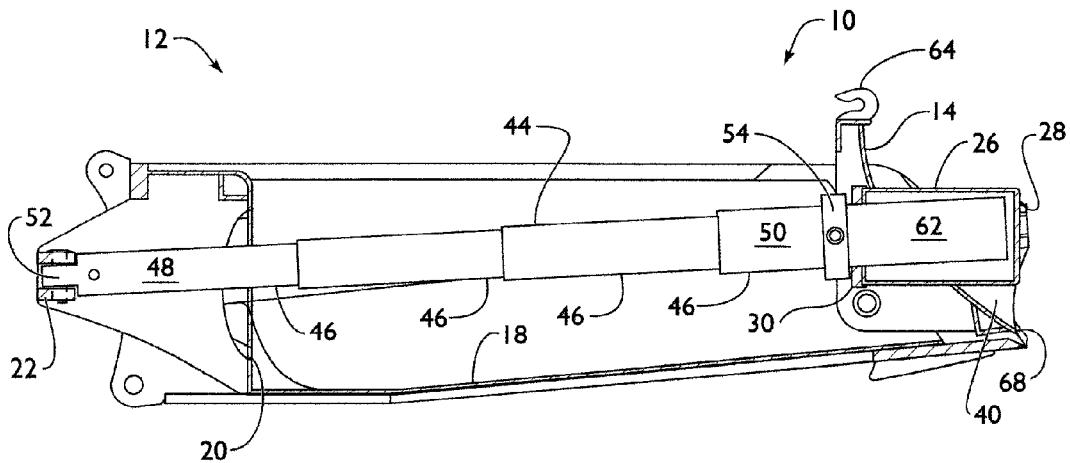
FIG. 3B is a side cutaway view of a mining scoop ejection system wherein the ejection blade is extended to the front of the bucket according to an embodiment of the present invention.
Figure 5:
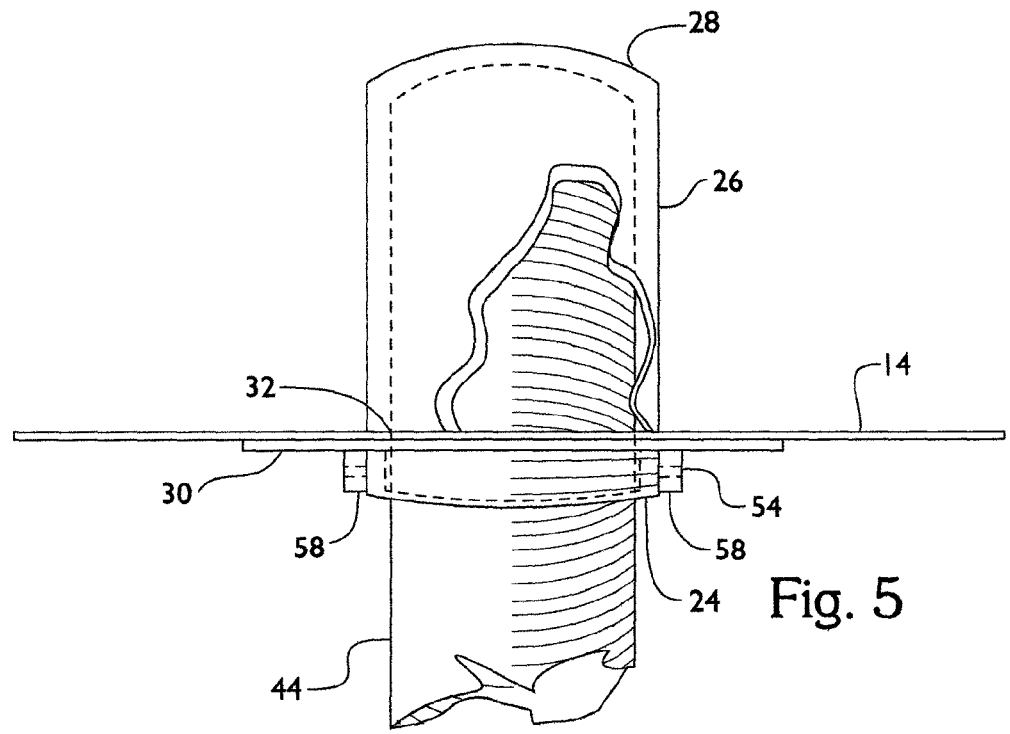
FIG. 5 is a side view of a retainer plate, blade, and floating trunnion according to an embodiment of the present invention having the telescoping cylinder engaged therein.

FIGS. 3A and 3B show a side view of the ejector blade 14. The ejector blade 14 has an opening 24 disposed therethrough for accommodating a capped cylinder 26 with a closed end 28. The capped cylinder 26 has a retainer plate 30, shown in FIGS. 4A and 4B, with an opening 32 therethrough. The retainer plate 30 is disposed opposite the closed end 28 of the capped cylinder 26, as shown in FIG. 5, to hold the capped cylinder 26 in the ejector blade opening 24.

Figure 6:
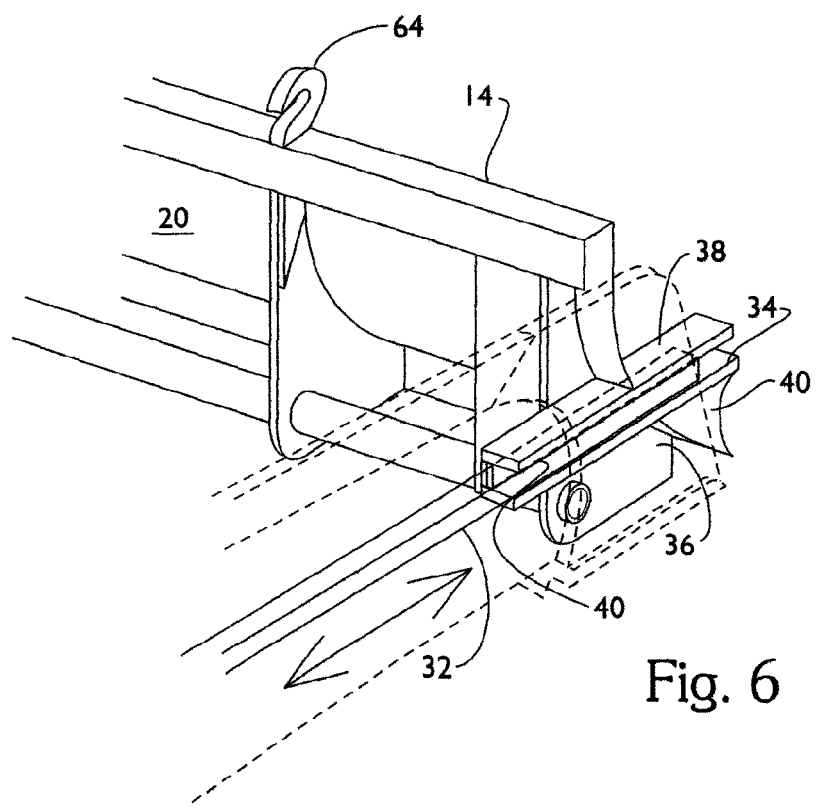
FIG. 6 is a side view of an ejector blade assembly according to an embodiment of the present invention.
Figure 7A:
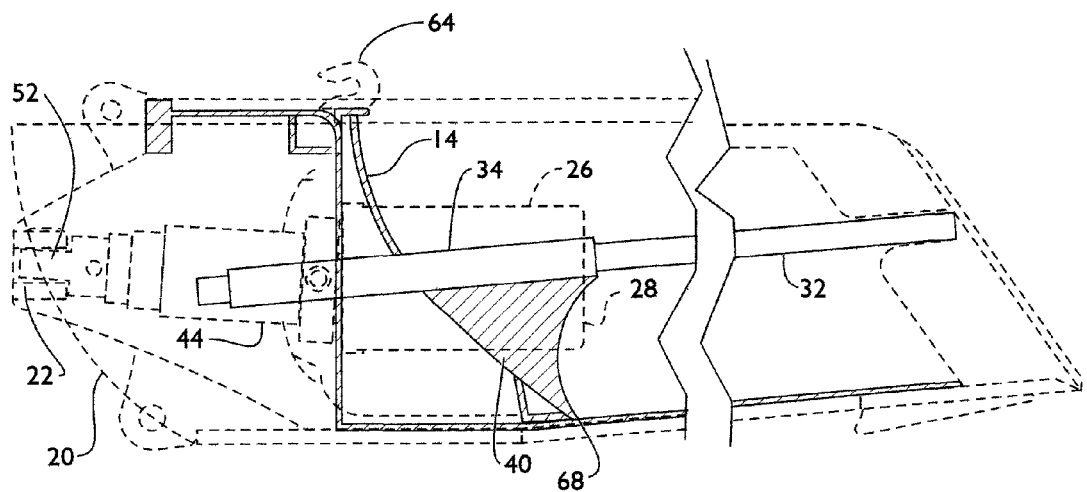
FIG. 7A is a side view of an ejector blade according to an embodiment of the present invention in a retracted position from one side
Figure 7B:
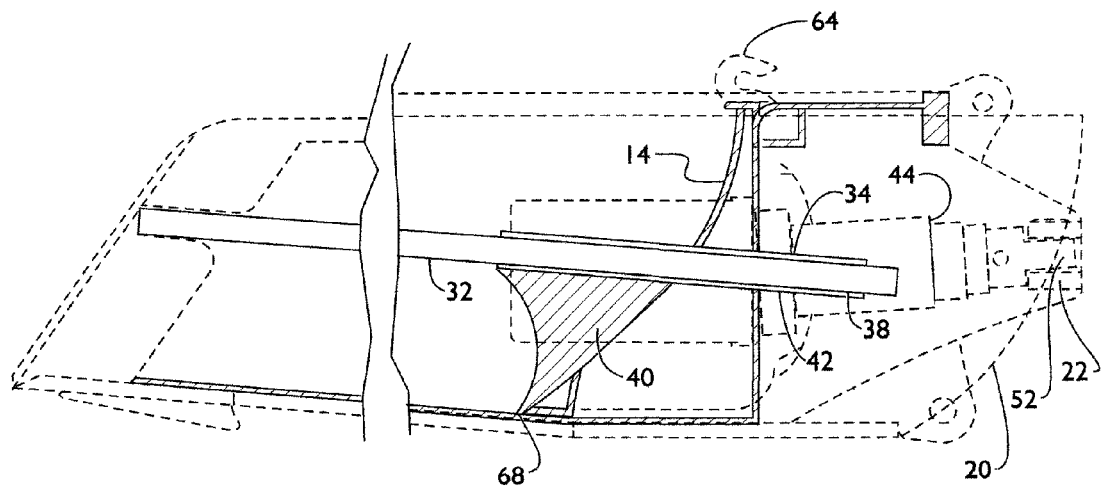
FIG. 7B is a side view of an ejector blade according to the embodiment of FIG. 7A in a retracted position from the other side.

FIGS. 6, 7A and 7B show bucket guide bars 32 and ejector blade channel guides 34 utilized by alternative embodiments of the present invention. At least one bucket guide bar 32 is disposed along at least one of the side walls 16 of the bucket 12 for slidably engaging at least one opposing end 36 of the ejector blade 14. The opposing bucket guide bars 32 are disposed along the side 16 of the bucket 12 for slidably engaging opposing ends 36 of the ejector blade 14. The ejector blade 16 channel guide 34 extends forward 38 of the blade 16, and has a cross portion 40 between the blade 16 and guide 34. The ejector blade 16 channel guide 34 extends backward 42 of the blade 16.

Figure 8:
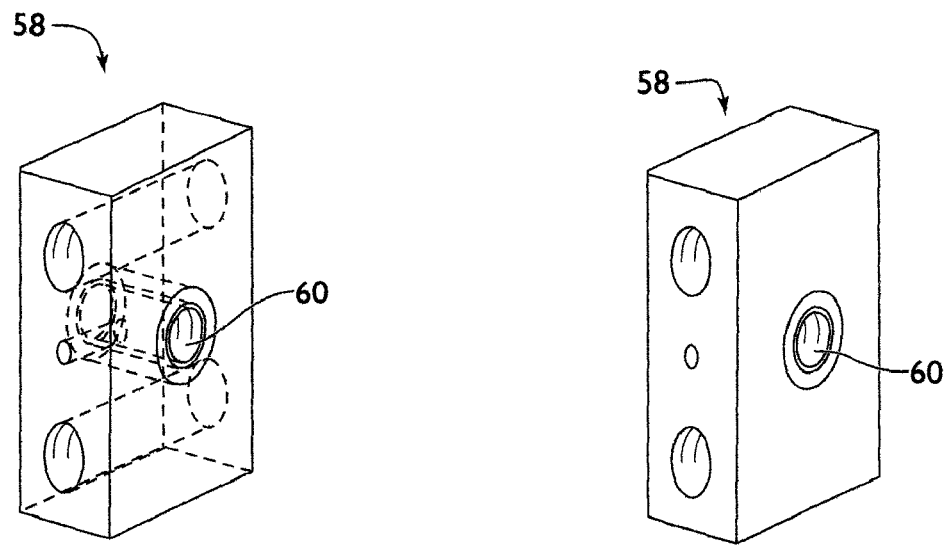
FIG. 8 is a view of part of the trunnion according to an embodiment of the present invention.
Figure 9:
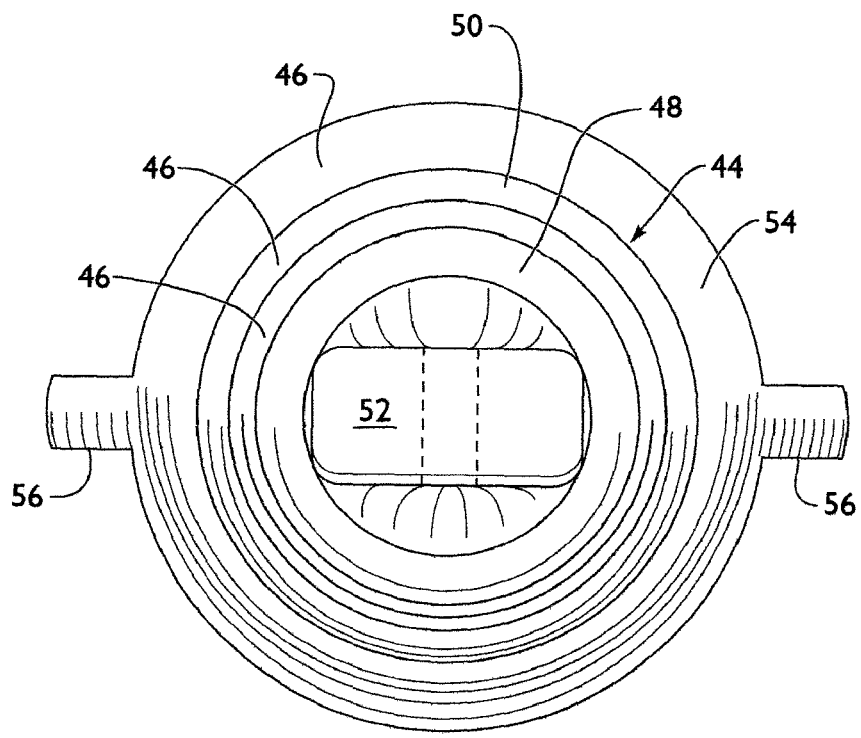
FIG. 9 is a front view of a telescoping cylinder according to an embodiment of the present invention.

A telescoping hydraulic cylinder 44 has retractable concentric cylinders 46, as shown in FIG. 9, ranging from smallest cylinder 48 to largest cylinder 50. The smallest cylinder 48 has a cylinder rod mount coupling 52 for engaging the cylinder rod mount 22. The largest cylinder 50 has a collar 54 disposed about the cylinder 50. The collar 54 has opposing pins 56 extending outward therefrom. Two holders 58, shown in FIG. 8, extend from the retainer plate 30. Each holder 58 has an opening 60 for rotatably accommodating the pins 56, forming a trunnion, such that the end 62 of the largest cylinder 50 extends into the capped cylinder 26 opposite the back wall 20 of the bucket 12. A conventional means for retracting and extending the telescoping hydraulic cylinder 44.

The telescoping hydraulic cylinder 44 is attached to the back 20 of the bucket 12 and to the blade 14 at such an angle as to place force angled toward the floor 18 of the bucket 12 to the blade 14, as shown in FIGS. 3A, 3B, 7A, and 7B. The cylinder rod mount coupling 22 and mount 52 permit pivotal lateral movement of the telescoping hydraulic cylinder 44. The trunnion permits vertical pivotal motion. The blade 16 has at least one hook 64 extending opposite the bottom to accommodate a chain and load.

Figure 10A:
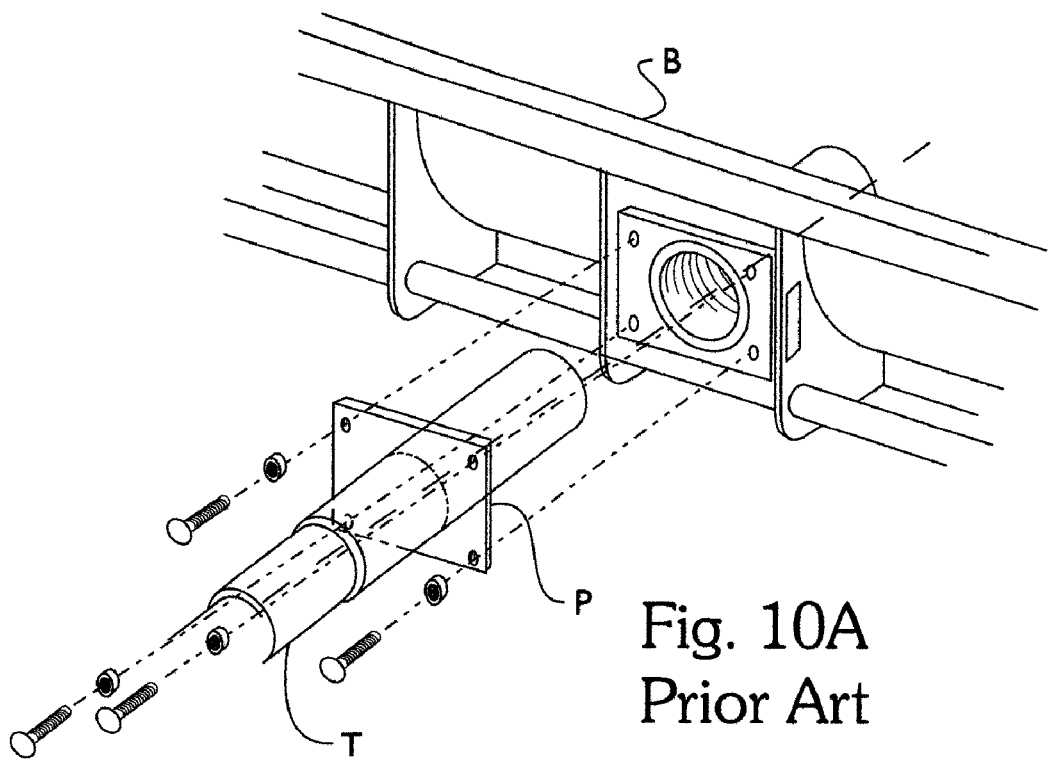
FIG. 10A is an environmental view of a conventional flange mount wherein the wide end of a telescoping cylinder is rigidly bolted into place preventing relative motion thereof.
Figure 10B:
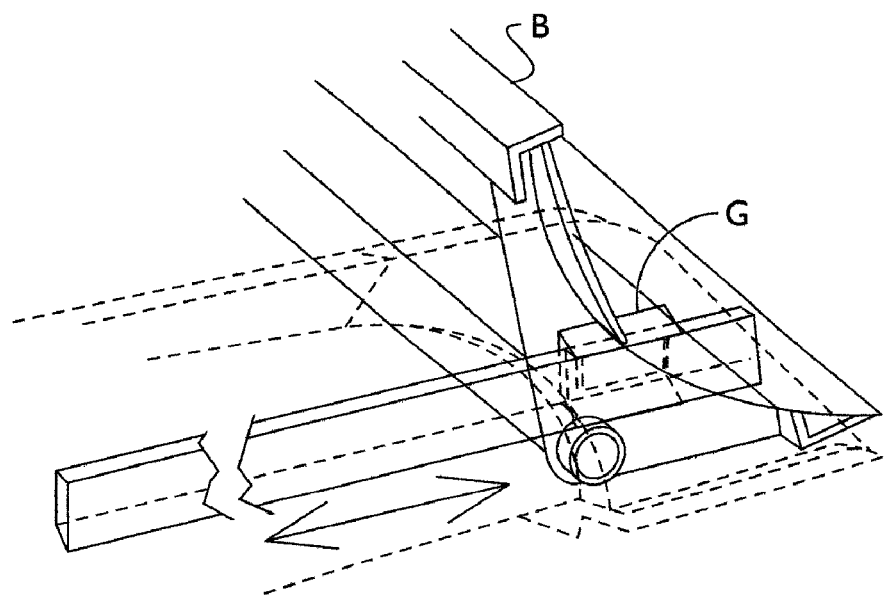
FIG. 10B is a side view of a conventional an ejector blade guide and bucket guide bar.

FIG. 10A is an environmental view of a conventional flange mount wherein the wide end of a telescoping cylinder is rigidly bolted into place preventing relative motion thereof. The conventional blade B has a rigid plate P. FIG. 10B is a side view of a conventional an ejector blade guide and bucket guide bar. The conventional blade guide G is quite small and does not extend far from the blade B.

It is to be understood that the present invention is not limited to the embodiments described above, but encompasses any and all embodiments within the scope of the following claims.

What is claimed is:

1. A bucket and blade assembly for a mining scoop, comprising:
    a bucket having two opposing side walls, a bottom floor, and a back wall, wherein the back wall has a cylinder rod mount attached thereto;
    an ejector blade, having two opposing ends, slidably disposed within the bucket extending from the floor between the opposing side walls, wherein the ejector blade has an opening disposed therethrough for accommodating a capped cylinder with a closed end, wherein the capped cylinder has a retainer plate, with an opening therethrough, disposed opposite the closed end of the capped cylinder, to hold the capped cylinder in the ejector blade opening;

a telescoping hydraulic cylinder having retractable concentric cylinders ranging from smallest to largest cylinders, wherein the smallest cylinder has a cylinder rod mount coupling for engaging the cylinder rod mount, and the largest cylinder has a collar disposed about the cylinder, the collar having opposing pins extending outward therefrom; and two holders extend from the retainer plate, each holder having an opening for rotatably accommodating the pins, forming a trunnion, such that the end of the largest cylinder mount extends into the capped cylinder opposite the back wall of the bucket.

2. The assembly of claim 1, further comprising:
at least one bucket guide bar disposed along at least one of the side walls of the bucket for slidably engaging at least one opposing end of the ejector blade.

3. The assembly of claim 1, further comprising:
opposing bucket guide bars disposed along the side of the bucket for slidably engaging opposing ends of the ejector blade.

4. The assembly of claim 2, further comprising:
an ejector blade channel guide disposed along at least one side of the blade to slidably engage the adjacent bucket guide bar.

5. The assembly of claim 3, further comprising:
opposing channel guides disposed along opposing sides of the blade slidably engaging the opposing bucket guide bars.

6. The assembly of claim 1, wherein:
the cylinder is attached to the back of the bucket and to the blade at such an angle as to place force angled toward the floor of the bucket to the blade.

7. The assembly of claim 1, wherein:
the cylinder rod mount coupling permits pivotal lateral movement of the telescoping hydraulic cylinder;
the trunnion permits vertical pivotal motion; or
combinations thereof.

8. The assembly of claim 1, wherein:
the blade further comprises at least one hook extending opposite the bottom to accommodate a chain.

9. The assembly of claim 4, wherein:
the ejector blade channel guide extends forward of the blade, and has a cross portion between the blade and guide extending forward of the blade; or
the ejector blade channel guide extends forward of the blade, and has a cross portion between the blade and guide extending forward of the blade, and the ejector blade channel guide extends backward of the blade.

10. The assembly of claim 5, wherein:
the ejector blade channel guide extends forward of the blade, and has a cross portion between the blade and guide extending forward of the blade;
the ejector blade channel guide extends backward of the blade; or
combinations thereof.

11. A bucket and blade assembly for a mining scoop, comprising:
a bucket having two opposing side walls, a bottom floor, and a back wall, wherein the back wall has a cylinder rod mount attached thereto;

an ejector blade, having two opposing ends, slidably disposed within the bucket extending from the floor between the opposing side walls, wherein the ejector blade has an opening disposed therethrough for accommodating a capped cylinder having a retainer plate, with an opening therethrough, disposed opposite the cap, to hold the capped cylinder in the ejector blade opening;

at least one bucket guide bar disposed along at least one on the side walls of the bucket for slidably engaging at least one opposing end of the ejector blade;

an ejector blade channel guide disposed along at least one side of the blade to slidably engage the adjacent bucket guide bar, extending forward of the blade, having a cross portion between the blade and the channel guide, extending backward of the blade, or combinations thereof;

a telescoping hydraulic cylinder having retractable concentric cylinders ranging from smallest to largest cylinders, wherein the smallest cylinder has a cylinder rod mount coupling for engaging the cylinder rod mount, and the largest cylinder has a collar disposed about the cylinder, the collar having opposing pins extending outward therefrom; and two holders extend from the retainer plate, each holder having an opening for rotatably accommodating the pins, forming a trunnion, such that the end of the largest cylinder mount extends into the capped cylinder opposite the back wall of the bucket.

12. The assembly of claim 11, further comprising:
opposing channel guides disposed along opposing sides of the blade slidably engaging the opposing bucket guide bars.

13. The assembly of claim 11, wherein:
the cylinder is attached to the back of the bucket and to the blade at such an angle as to place force angled toward the floor of the bucket to the blade.

14. The assembly of claim 11, wherein:
the cylinder rod mount coupling opening permits pivotal lateral movement of the telescoping hydraulic cylinder;
the trunnion permits vertical pivotal motion; or
combinations thereof.

* * * * *